(12) United States Patent
Rovelli et al.

(10) Patent No.: US 12,367,287 B2
(45) Date of Patent: Jul. 22, 2025

(54) FIELD FIRMWARE UPDATE

(71) Applicant: Micron Technology, Inc., Boise, ID (US)

(72) Inventors: Angelo Alberto Rovelli, Agrate Brianza (IT); Alessandro Orlando, Milan (IT); Craig A. Jones, Plano, TX (US); Federica Cresci, Milan (IT); Niccolò Izzo, Vignate (IT); Danilo Caraccio, Milan (IT)

(73) Assignee: Micron Technology, Inc., Boise, ID (US)

( * ) Notice: Subject to any disclaimer, the term of this patent is extended or adjusted under 35 U.S.C. 154(b) by 308 days.

(21) Appl. No.: 17/969,916

(22) Filed: Oct. 20, 2022

(65) Prior Publication Data

US 2023/0394155 A1 Dec. 7, 2023

Related U.S. Application Data

(60) Provisional application No. 63/348,432, filed on Jun. 2, 2022.

(51) Int. Cl.
*G06F 21/57* (2013.01)
*G06F 8/654* (2018.01)
*G06F 21/60* (2013.01)
*H04L 9/06* (2006.01)

(52) U.S. Cl.
CPC ............ *G06F 21/572* (2013.01); *G06F 8/654* (2018.02); *G06F 21/602* (2013.01); *H04L 9/0631* (2013.01); *G06F 2221/033* (2013.01)

(58) Field of Classification Search
CPC ...... G06F 21/572; G06F 8/654; G06F 21/602; G06F 2221/033; G06F 8/65; H04L 9/0631; H04L 9/0891
See application file for complete search history.

(56) References Cited

U.S. PATENT DOCUMENTS

| | | | |
|---|---|---|---|
| 9,229,706 B2 | 5/2016 | Asnaashari | |
| 10,223,531 B2 | 3/2019 | Schilder et al. | |
| 10,776,102 B1 | 9/2020 | Dsouza et al. | |
| 10,866,798 B2 | 12/2020 | Nolan et al. | |
| 11,144,299 B2 | 10/2021 | Lin | |
| 2020/0257518 A1* | 8/2020 | Liedtke | G06F 8/65 |
| 2021/0312057 A1* | 10/2021 | Kloth | G06F 21/575 |
| 2022/0113960 A1* | 4/2022 | Moran | G06F 8/658 |

FOREIGN PATENT DOCUMENTS

EP 3974954 A1 3/2022

\* cited by examiner

*Primary Examiner* — Izunna Okeke
(74) *Attorney, Agent, or Firm* — Brooks, Cameron & Huebsch, PLLC (57) ABSTRACT

Methods, systems, and devices related to field firmware update (FFU). A first memory of a memory module may receive an encrypted segment of a FW package associated with FFU. A decrypted segment of the FW package may be stored by the first memory. A re-encrypted segment of the FW package may be stored by the first memory. The re-encrypted segment of the FW package may be communicated to a second memory of the memory module.

23 Claims, 10 Drawing Sheets

FIELD FIRMWARE UPDATE

PRIORITY INFORMATION

This application claims the benefit of U.S. Provisional Application Ser. No. 63/348,432 filed on Jun. 2, 2022, the contents of which are incorporated herein by reference.

TECHNICAL FIELD

The present disclosure relates generally to semiconductor memory and methods, and more particularly, to apparatuses, systems, and methods of Field Firmware Update (FFU).

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes Random Access Memory (RAM), Dynamic Random Access Memory (DRAM), Static Random Access Memory (SRAM), Synchronous Dynamic Random Access Memory (SDRAM), and Thyristor Random Access Memory (TRAM), among others. Non-volatile memory can provide persistent data by retaining stored data when not powered and can include NAND flash memory, NOR flash memory, Ferroelectric Random Access Memory (FeRAM), and resistance variable memory such as Phase Change Random Access Memory (PCRAM), Resistive Random Access Memory (RRAM), and Magnetoresistive Random Access Memory (MRAM), such as Spin Torque Transfer Random Access Memory (STTRAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIGS. 3A-8B illustrate block diagrams representative of FFU in accordance with a number of embodiments of the present disclosure.

DETAILED DESCRIPTION

Systems, apparatuses, and methods related to Field Firmware Update (FFU) are described. In some embodiments, FFU can be secure in which encryption is used to ensure protection of the integrity and/or authenticity of the firmware (FW). An image of a FW update can be loaded onto a memory module in an encrypted form. A key can be used to encrypt the image. The memory module can use the key to decrypt the image and validate the FW package. The memory module can then encrypt the image. The same key or a different key can be used to encrypt the image.

Updating FW of a memory module may be limited by "scarcity of resources" of the memory module. For instance, there may be limited amount of memory available to a FW update process, such as FFU. Some previous approaches to FFU, if any exist, may be limited by a storage capacity of a buffer of a memory device onto which a FW package (e.g., an image of a FW package) is loaded being insufficient (e.g., too small) to store the entire FW package. For instance, it may be cost prohibitive to increase the storage capacity of such a buffer because of the corresponding increase in the physical size of the buffer. Furthermore, increasing the physical size of a component (e.g., a buffer) of a memory module to provide a storage capacity not needed for consistent (e.g., "day-to-day") operation of the memory module (FFU may occur sporadically) may be cost prohibitive.

Some previous approaches to secure FFU may be limited by encryption and/or decryption of a FW package. For instance, encryption and/or decryption of a FW package may require one process (e.g., decryption of a FW package) to be completed before another process (e.g., encryption of a FW package) can be started. Thus, previous approaches do not provide interleaving of decryption and encryption.

Aspects of the present disclosure address the above and other deficiencies by providing FFU and secure FFU without increasing a storage capacity of a buffer. Some embodiments enable decryption and encryption of a FW package to be performed in an interleaved or nearly interleaved manner. As used herein, "interleaved" refers to read, store, and/or communicate two or more separate streams of data that originated as a continuous sequence of data (e.g., segments of a FW package) by alternating between the two or more separate streams of data. A FW package can be divided into segments of a size based on a storage capacity of a buffer onto which the segments are loaded. As a segment of a FW package is decrypted or encrypted, the decrypted or encrypted segment is written to a different portion of the buffer. By doing so, the buffer only needs to have a storage capacity twice the size of a segment. As soon as one segment of the FW package is communicated to a non-volatile memory device, the next segment is loaded onto the buffer.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like. The terms "data" and "data values" are used interchangeably herein and can have the same meaning, as appropriate to the context.

The figures herein follow a numbering convention in which the first digit or digits correspond to the drawing figure number and the remaining digits identify an element or component in the drawing. Similar elements or components between different figures may be identified by the use of similar digits. For example, element 122 can represent element 22 in FIG. 1, and a similar element can be labeled 222 in FIG. 2. Analogous elements within a figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
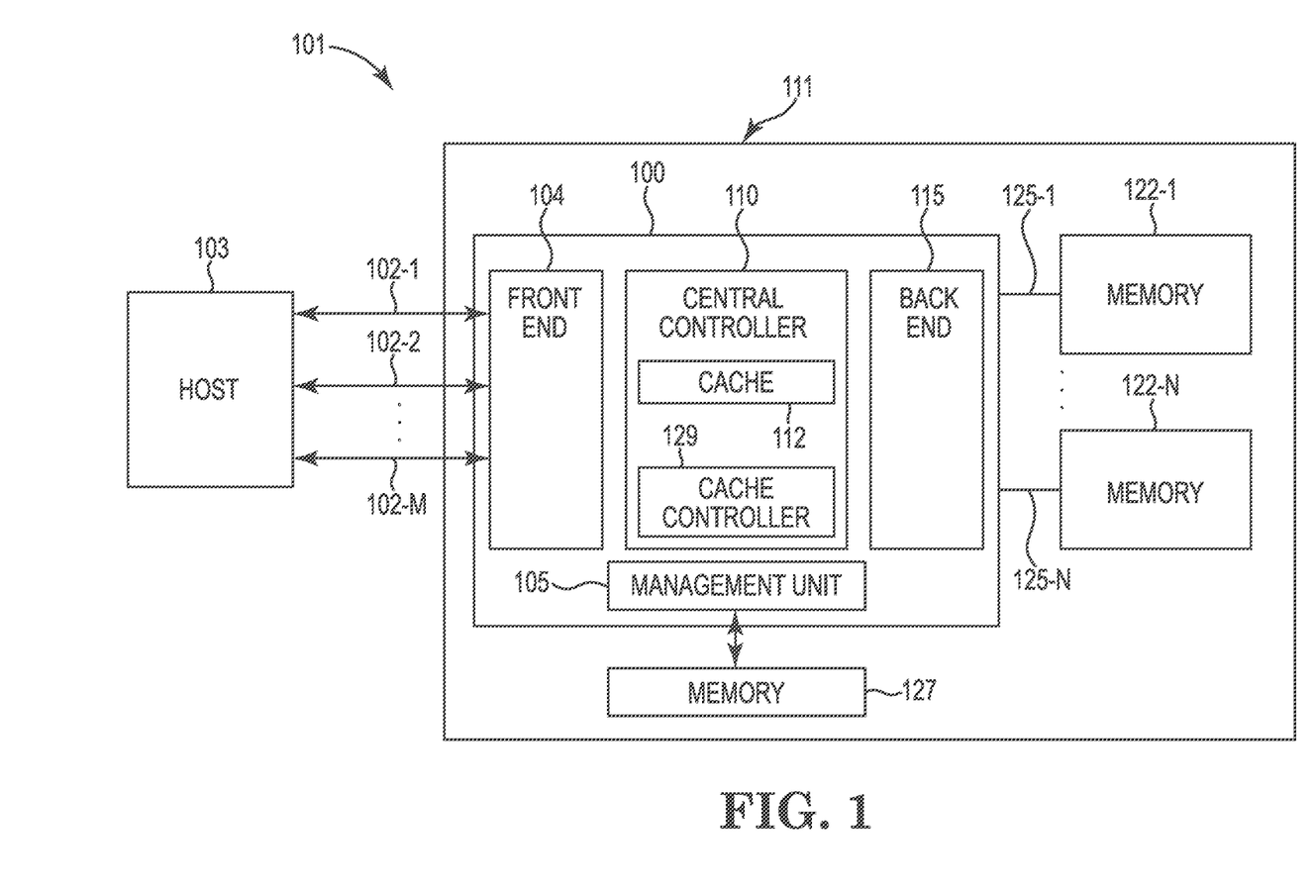
FIG. 1 illustrates a functional block diagram in the form of a computing system including a controller for FFU in accordance with a number of embodiments of the present disclosure.

FIG. 1 illustrates a functional block diagram in the form of a computing system 101 including a controller 100 for FFU in accordance with a number of embodiments of the present disclosure. The computing system 101 includes a memory module 111. The memory module 111 can include the controller 100 and one or more memories and/or memory devices coupled thereto.

The controller 100 can include a front end portion 104, a central controller portion 110, and a back end portion 115. The computing system 101 can further include a host 103, memory devices 122-1, . . . , 122-N (collectively referred to as memory devices 122), and a memory 127. The memory 127 can be a flash memory accessible via a serial peripheral interface (SPI). The memory 127 can include other circuitry, firmware, software, or the like, whether alone or in combination. In some embodiments, the memory 127 can be a buffer onto which segments of a FW package are loaded.

The front end portion 104 includes an interface to couple the controller 100 to the host 103 through input/output (I/O) lanes 102-1, 102-2, . . . , 102-M (collectively referred to as I/O lanes 102). The front end portion includes interface management circuitry to manage the I/O lanes 102. The front end portion can include any quantity of the I/O lanes 102 (e.g., eight, sixteen I/O lanes 102). In some embodiments, the I/O lanes 102 can be configured as a single port. In some embodiments, the interface between the controller 100 and the host 103 can be a Peripheral Component Interconnect express (PCIe) physical and electrical interface operated according to a Compute Express Link (CXL) protocol.

In some embodiments, the computing system 101 can be a CXL compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as I/O protocol, memory protocol (e.g., initially allowing a host to share memory with an accelerator), and coherency interface.

The central controller portion 110 includes a cache memory 112 (alternatively referred to as a cache). In some embodiments, in response to receiving a read request for data stored in the cache memory 112, the data can be provided to the host 103 as requested without further accessing the memory device 122. In some embodiments, in response to receiving a write request, data can be stored in the cache memory 112 prior to writing the data to the memory device 122.

The central controller portion 110 can control, in response to receiving a memory access request from the host 103, for example, performance of one or more memory operations. Non-limiting examples of memory operations include a memory operation to read data from the cache memory 112 and/or a memory device 122 and an operation to write data to the cache memory 112 and/or a memory device 122. In some embodiments, the central controller portion 110 can control writing of multiple pages of data substantially simultaneously.

As used herein, the term "substantially" intends that the characteristic may not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces, media controllers that are utilized "substantially simultaneously" may not start or finish at exactly the same time. For example, the multiple memory controllers can be utilized such that they are writing data to the memory devices at the same time regardless if one of the media controllers commences or terminates prior to the other.

The back end portion 115 can include media control circuitry and a physical (PHY) layer that couples the memory controller 100 to the memory devices 122. As used herein, the term "PHY layer" generally refers to the physical layer in the Open Systems Interconnection (OSI) model of a computing system. The PHY layer can be the first (e.g., lowest) layer of the OSI model and used to transfer data over a physical data transmission medium. In some embodiments, the physical data transmission medium can include channels 125-1, . . . , 125-N (collectively referred to as the channels 125). The channels 125 can include a sixteen-pin data bus and a two pin data mask inversion (DMI) bus, for example, among other possible buses. The back end portion 115 can communicate (e.g., transmit and/or receive) data to and/or from the memory devices 122 via the data pins. Error detection information and/or error correction information can be communicated to and/or from the memory devices 122 via the DMI bus. Error detection information and/or error correction information can be communicated contemporaneously with the exchange of data.

One or more of the memory devices 122 can be non-volatile memory devices. An example of the memory devices 122 is dynamic random access memory (DRAM). DRAM can be operated according to a protocol, such as low-power double data rate (LPDDRx), (e.g., LPDDRx DRAM devices, LPDDRx memory, etc.). The "x" in LPDDRx refers to any of a number of generations of the protocol (e.g., LPDDR5). In some embodiments, at least one of the memory devices 122 is operated as an LPDDRx DRAM device with low-power features enabled and at least one of the memory devices 122 is operated as an LPDDRx DRAM device with at least one low-power feature disabled. In some embodiments, the memory devices 122 are LPDDRx memory devices, but the memory devices 122 do not include circuitry configured to provide low-power functionality, such as a dynamic voltage frequency scaling core (DVFSC), a sub-threshold current reduce circuit (SCRC), or other low-power functionality providing circuitry. The LPDDRx memory devices 122 without such circuitry can advantageously reduce the cost, size, and/or complexity of the LPDDRx memory devices 122. By way of example, an LPDDRx memory device with reduced low-power functionality providing circuitry can be used for applications other than mobile applications (e.g., if the memory is not intended to be used in a mobile application, some or all low-power functionality can be sacrificed for a reduction in the cost of producing the memory).

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the controller 100. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

In some embodiments, the management unit 105 can be configured to provide FFU in accordance with the present disclosure. However, embodiments of the present disclosure are not so limited. For example, other portions, components, and/or circuitry of the controller 100 can be configured to provide FFU, individually or in combination, in accordance with the present disclosure.

The management unit 105 can include direct memory access (DMA) circuitry. DMA circuitry can be referred to a DMA engine or a secure DMA (S-DMA) engine. As described herein, the DMA circuitry can decrypt and/or encrypt segments of a FW package concurrently with communication of other segments (decrypted or encrypted) of the FW package. For instance, a segment of a FW package can be encrypted or decrypted concurrently with communication of another segment of the FW package from the host 103 to the memory module 111. The DMA circuitry is described further in association with FIGS. 3A-8B.

In some embodiments, the controller 100, or a component thereof (e.g., the management unit 105), can direct writing of respective encrypted segments of a FW package to a buffer. Although not specifically illustrated by FIG. 1, the controller 100, or a component thereof (e.g., the management unit 105), can include the buffer. The controller 100 can decrypt the respective encrypted segments of the FW package stored in the buffer using a first key to yield respective decrypted segments of the FW package. The controller 100 can direct writing of the respective decrypted segments of the FW package to the buffer. The controller 100 can encrypt the respective decrypted segments of the FW package stored in the buffer using a second key to yield respective re-encrypted segments of the FW package. The controller 100 can direct writing of the respective re-encrypted segments of the FW package to the buffer. The controller 100 can direct writing of the respective re-encrypted segments of the FW package from the buffer to a memory, such as the memory 127. Although the memory 127 is illustrated as a separate component from the controller 100, embodiments of the present disclosure are not limited to communicating respective re-encrypted segments of a FW package to a memory external to the management unit 105 or the controller 100.

In some embodiments, the controller 100 can direct writing of the respective decrypted segments of the FW package to the buffer concurrently with decryption of the respective encrypted segments of the FW package. The controller 100 can direct writing of the respective re-encrypted segments of the FW package to the buffer concurrently with encryption of the respective decrypted segments of the FW package. The controller 100 can direct writing of the respective encrypted segments and/or the respective re-encrypted segments of the FW package to a first address space of the buffer and the respective decrypted segments of the FW package to a second address space of the buffer.

Figure 2:
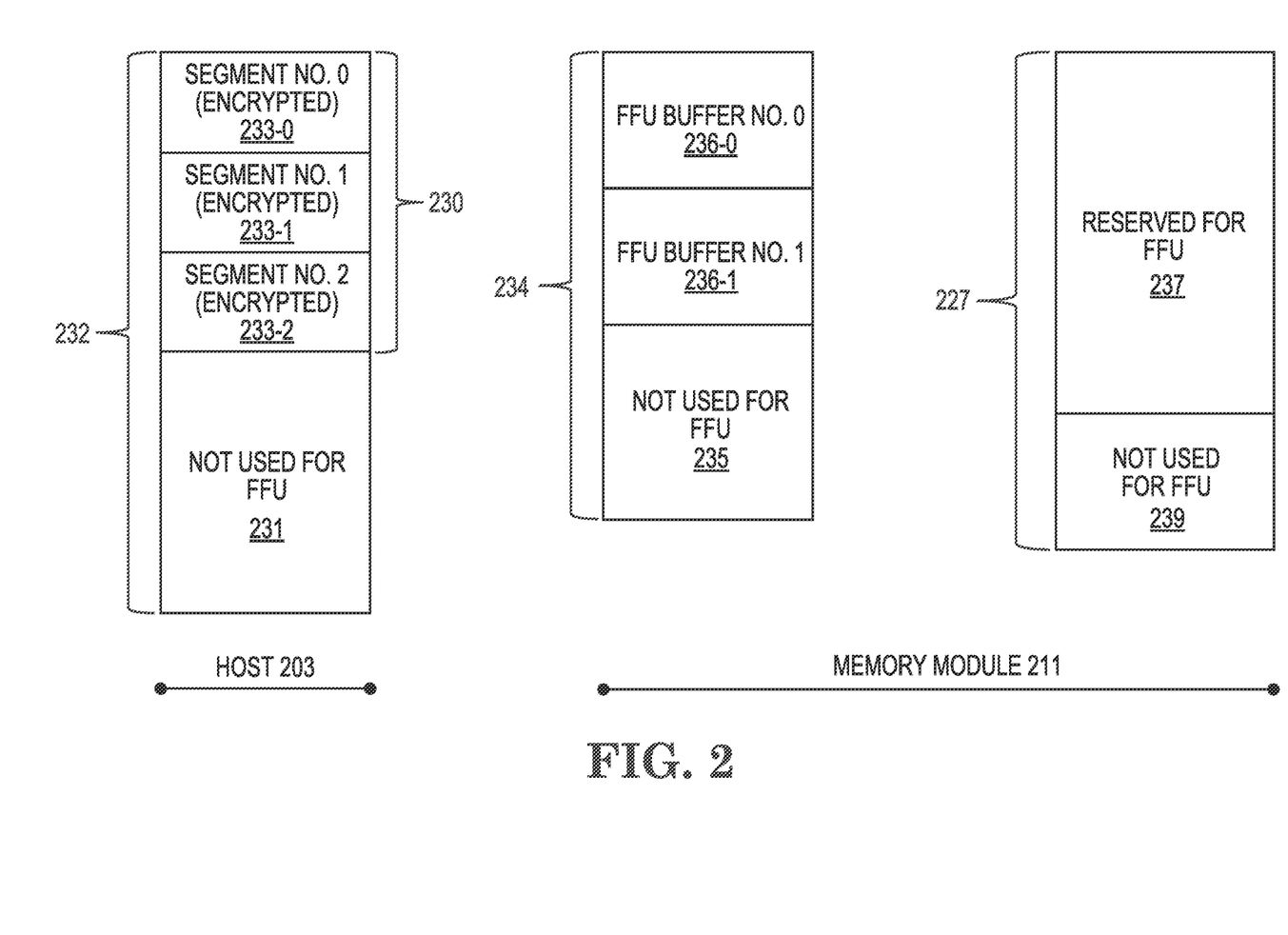
FIG. 2 illustrates a block diagram representative of initial conditions for FFU in accordance with a number of embodiments of the present disclosure.

FIG. 2 illustrates a block diagram representative of initial conditions for FFU in accordance with a number of embodiments of the present disclosure. The left portion of FIG. 2 represents a memory 232 of a host 203, which can be analogous to the host 103 described in association with FIG. 1. The right portion of FIG. 2 represents a memory module 211, which can be analogous to the memory module 111 described in association with FIG. 1. FIG. 2 illustrates a buffer 234 of the memory module 211. FIG. 2 also illustrates a memory 227 of the memory module 211, which can be analogous to the memory 127.

As illustrated by FIG. 2, the memory 232 stores a FW package 230. Storage space 231 of the memory 232 is not used for FFU. However, it is not necessary for the memory 232 to include the extra storage space 231. The FW package 230 is divided into segments 233-0, 233-1, and 233-1 (referred collectively as the segments 233). As illustrated by FIG. 2, the segments 233 are encrypted. As such, the segments 233 can also be referred to as the encrypted segments 233. The FW package 230 can be encrypted according to an advanced encryption standard (AES).

For ease of description and illustration only, an examples described herein include the FW package 230 divided three segments 233. However, a FW package can be divided into hundreds and thousands of segments, for example. In some embodiments, one or more of the segments 233 can be of a different size than others of the segments 233. For instance, the segments 233-0 and 233-1 can be of the same size and the segment 233-2 can be of a different size.

The buffer 234 includes a first portion (e.g., a first address space) 236-0 and a second portion (e.g., a second address space) 236-1. Storage space 235 of the buffer 234 is not used for FFU. However, it is not necessary for the buffer 234 to include the extra storage space 235. The size of the segments 233 can be based on the storage capacity of the buffer 234. In some embodiments, the size of the segments 233 (e.g. less than 1 megabyte (MB)) can be smaller than storage capacity of the portions 236-0 and 236-1 (e.g. 1 MB). However, the total size of the FW package 230 is exceeds the storage capacity of the portions 236-0 and 236-1.

The memory 227 includes a portion 237 reserved for FFU and a portion 239 not used for FFU. However, it is not necessary for the memory 227 to include the portion 239. The storage capacity of the portion 237 is sufficient for the total size of the FW package 230.

Figure 3A:
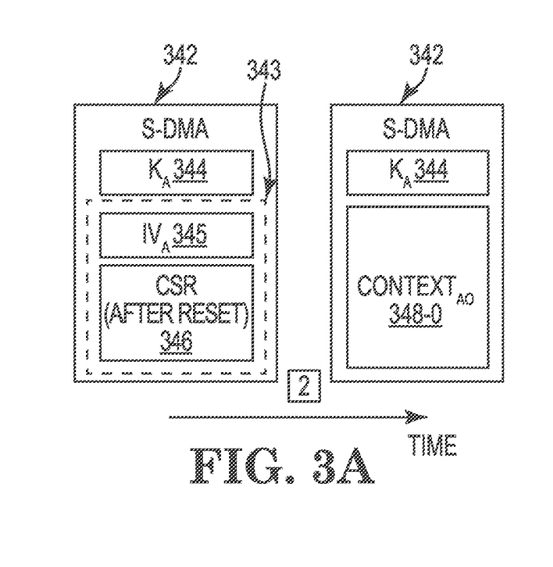
Figure 3B:
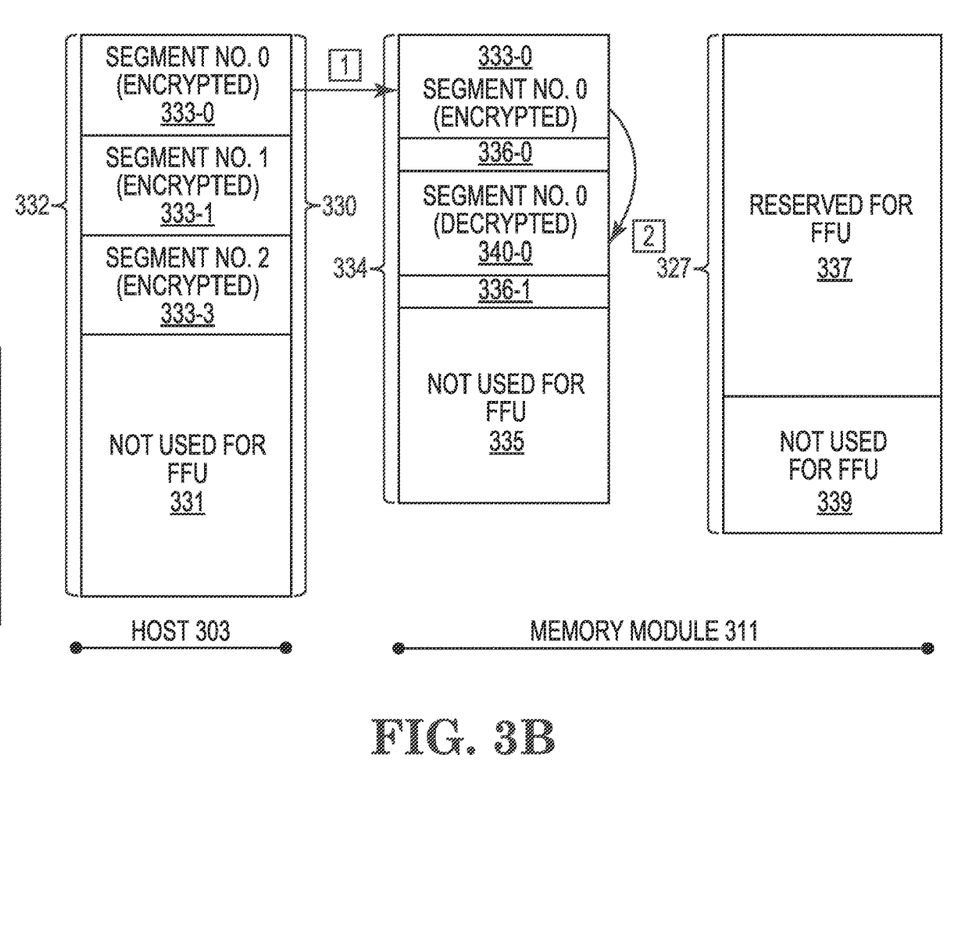

FIGS. 3A-3B illustrate block diagrams representative of FFU in accordance with a number of embodiments of the present disclosure. FIG. 3A illustrates S-DMA circuitry 342. The S-DMA circuitry 342 can be a component of the controller 100 of the memory module 111 described in association with FIG. 1. The left side of FIG. 3A represents a state of the S-DMA circuitry 342 at a point in time and the right side of FIG. 3A represents a state of the S-DMA circuitry 342 at a subsequent point in time as illustrated by the arrow pointing to the right representing the flow of time.

The left portion of FIG. 3B represents the memory 332 of the host 303, which can be analogous to the host 103 described in association with FIG. 1. The right portion of FIG. 3B represents the memory module 311, which can be analogous to the memory module 111. The buffer 334 and the memory 327 can be analogous to the buffer 234 and the memory 227, respectively, described in association with FIG. 2.

At 1 of FIG. 3B, the encrypted segment 333-0 is written to the first portion 336-0 of the buffer 334. The writing of the encrypted segment 333-0 can include execution of a CXL command.

At 2 of FIGS. 3A-3B, the encrypted segment 333-0 is decrypted by the S-DMA circuitry 342 using a first key ($K_A$) 344 and a first initial vector ($IV_A$) 345. The value of an Initialization Vector (IV) can be stored in a register of the controller 100, which can be a register dedicated for values of IVs (an IV register). At the beginning of an encryption and/or decryption process of a data stream A, the register can be initialized with a value $IV_A$. The encryption and/or decryption process of the data stream A can be suspended to begin an encryption and/or decryption process of a data stream B. The register then stores a different value than $IV_A$. This value, along with values stored by other registers of the controller 100, is referred to as $context_{A0}$. To resume the encryption and/or decryption process of the data stream A, the IV register can be initialized with a value stored in the $context_{A0}$ and not the initial value $IV_A$.

The first key ($K_A$) 344 and the first initial vector ($IV_A$) 345 can be associated with the host 303. The first initial vector ($IV_A$) 345 and Control and Status Registers (CSRs) 346 (after a reset) can be referred to as context 343. The decrypted segment 340-0, yielded by decryption of the encrypted segment 333-0, is written to the second portion 336-1 of the buffer 334 by the S-DMA circuitry 342. The decryption of the encrypted segment 333-0 occurs at least partially concurrently with writing of the decrypted segment 340-0. After the decryption of the encrypted segment 333-0, the context 343 is updated with the final value of the first initial vector ($IV_A$) 345 to yield $context_{A0}$ 348-0.

Figure 4A:
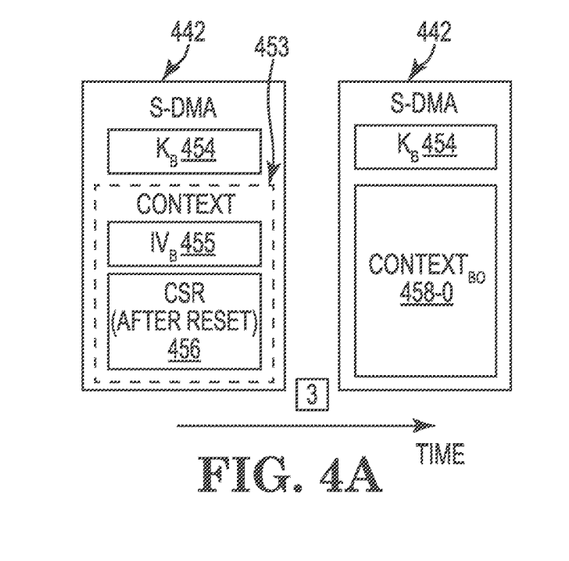
Figure 4B:
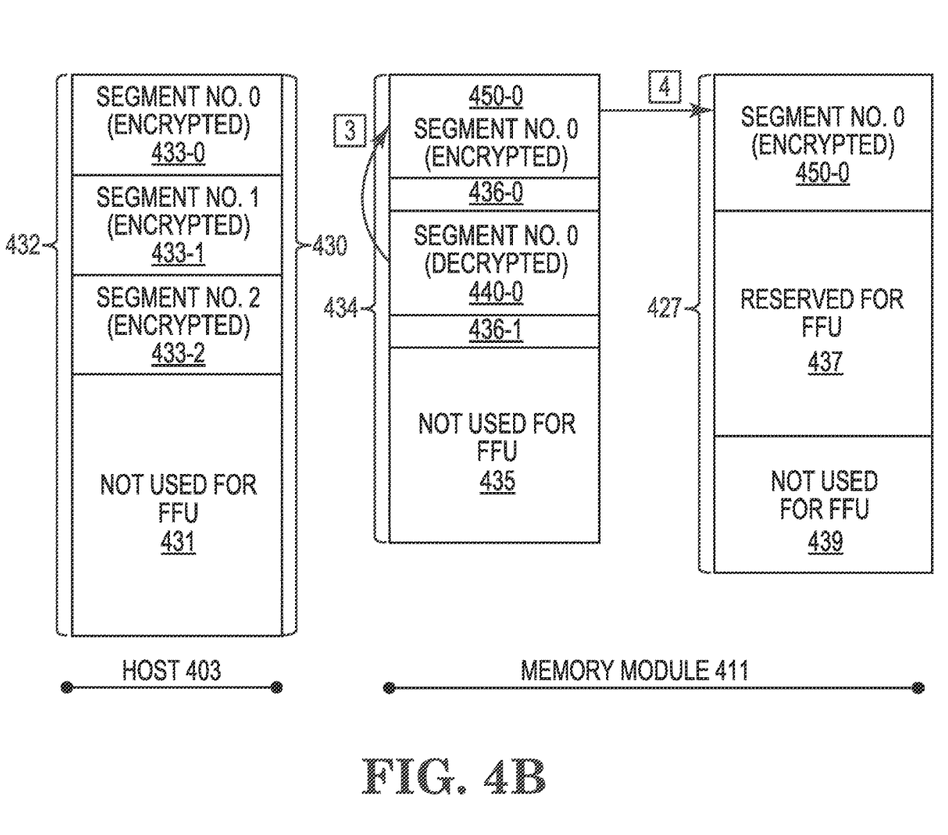

FIGS. 4A-4B illustrate block diagrams representative of FFU in accordance with a number of embodiments of the present disclosure. FIG. 4A illustrates the S-DMA circuitry 442, which can be analogous to the S-DMA circuitry 342 described in association with FIG. 3A. The left side of FIG. 4A represents a state of the S-DMA circuitry 442 at a point in time and the right side of FIG. 4A represents a state of the S-DMA circuitry 442 at a subsequent point in time as illustrated by the arrow pointing to the right representing the flow of time.

The left portion of FIG. 4B represents the memory 432 of the host 403, which can be analogous to the host 103 described in association with FIG. 1. The right portion of FIG. 4B represents the memory module 411, which can be analogous to the memory module 111. The buffer 434 and the memory 427 can be analogous to the buffer 234 and the memory 227, respectively, described in association with FIG. 2.

At 3 of FIGS. 4A-4B, the decrypted segment 440-0 is encrypted (re-encrypted) by the S-DMA circuitry 442 using a second key ($K_B$) 454 and a second initial vector ($IV_B$) 455. The second key ($K_{B0}$) 454 and the second initial vector ($IV_B$) 455 can be associated with the memory module 411. The first initial vector ($IV_B$) 455 and CSRs 456 (after a reset) can be referred to as context 453. The re-encrypted segment 450-0, yielded by encryption of the decrypted segment 440-0, is written to the first portion 436-0 of the buffer 434 by the S-DMA circuitry 442. The encryption of the decrypted segment 440-0 occurs at least partially concurrently with writing of the re-encrypted segment 450-0. After the encryption of the decrypted segment 440-0, the context 453 is updated with the final value of the second initial vector ($IV_B$) 455 to yield $context_{B0}$ 458-0.

At 4 of FIG. 4B, the re-encrypted segment 450-0 is written to the memory 427. The re-encrypted segment 450-0 can be written to a starting address of the portion 437.

Figure 5A:
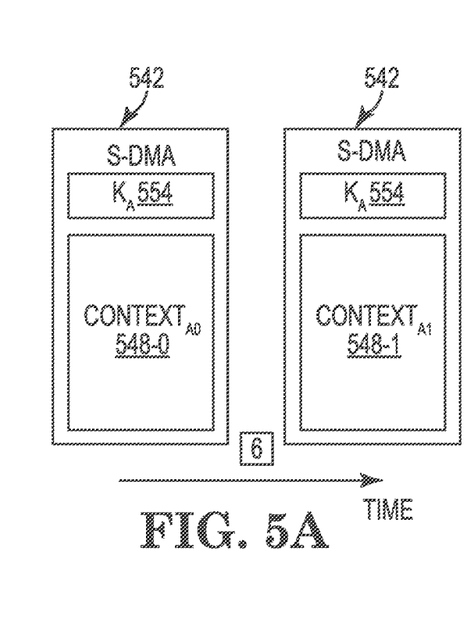
Figure 5B:
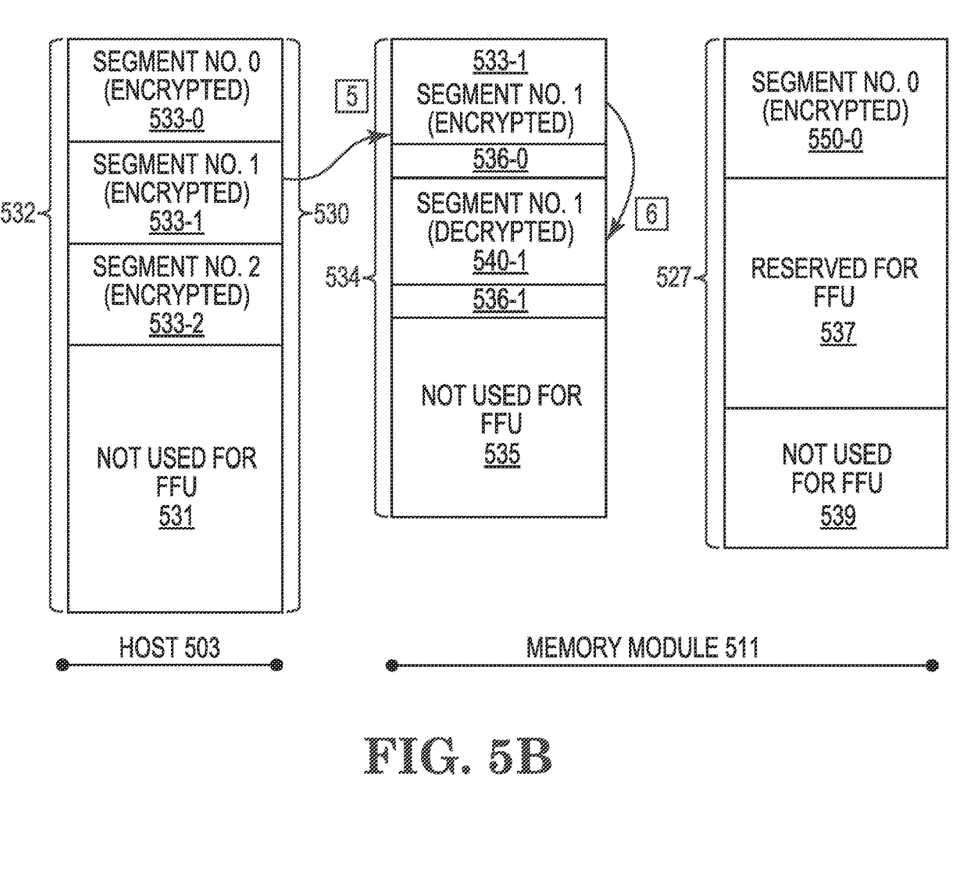

FIGS. 5A-5B illustrate block diagrams representative of FFU in accordance with a number of embodiments of the present disclosure. FIG. 5A illustrates the S-DMA circuitry 542, which can be analogous to the S-DMA circuitry 342 described in association with FIG. 3A. The left side of FIG. 5A represents a state of the S-DMA circuitry 542 at a point in time and the right side of FIG. 5A represents a state of the S-DMA circuitry 542 at a subsequent point in time as illustrated by the arrow pointing to the right representing the flow of time.

The left portion of FIG. 5B represents the memory 532 of the host 503, which can be analogous to the host 103 described in association with FIG. 1. The right portion of FIG. 5B represents the memory module 511, which can be analogous to the memory module 111. The buffer 534 and the memory 527 can be analogous to the buffer 234 and the memory 227, respectively, described in association with FIG. 2.

At 5 of FIG. 5B, the next segment of the FW package 530, the encrypted segment 533-1 is written to the first portion 536-0 of the buffer 534. The writing of the encrypted segment 533-1 can include execution of a CXL command.

At 6 of FIGS. 5A-5B, the encrypted segment 533-1 is decrypted by the S-DMA circuitry 542 using the first key ($K_A$) 544 and the $context_{A0}$ 548-0. The $context_{A0}$ 548-0 can include the first initial vector ($IV_A$). The S-DMA circuitry 542 can be configured with the $context_{A0}$ 548-0 prior to initiating decryption of the encrypted segment 533-1. The decrypted segment 540-1, yielded by decryption of the encrypted segment 533-1, is written to the second portion 536-1 of the buffer 534 by the S-DMA circuitry 542. The decryption of the encrypted segment 533-1 occurs at least partially concurrently with writing of the decrypted segment 540-1. After the decryption of the encrypted segment 533-1, the $context_{A0}$ 548-0 is updated with the final value of the first initial vector ($IV_A$) to yield $context_{A1}$ 548-1.

Figure 6A:
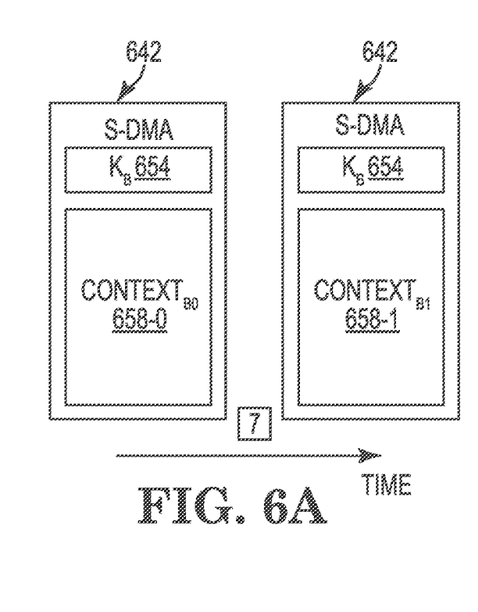
Figure 6B:
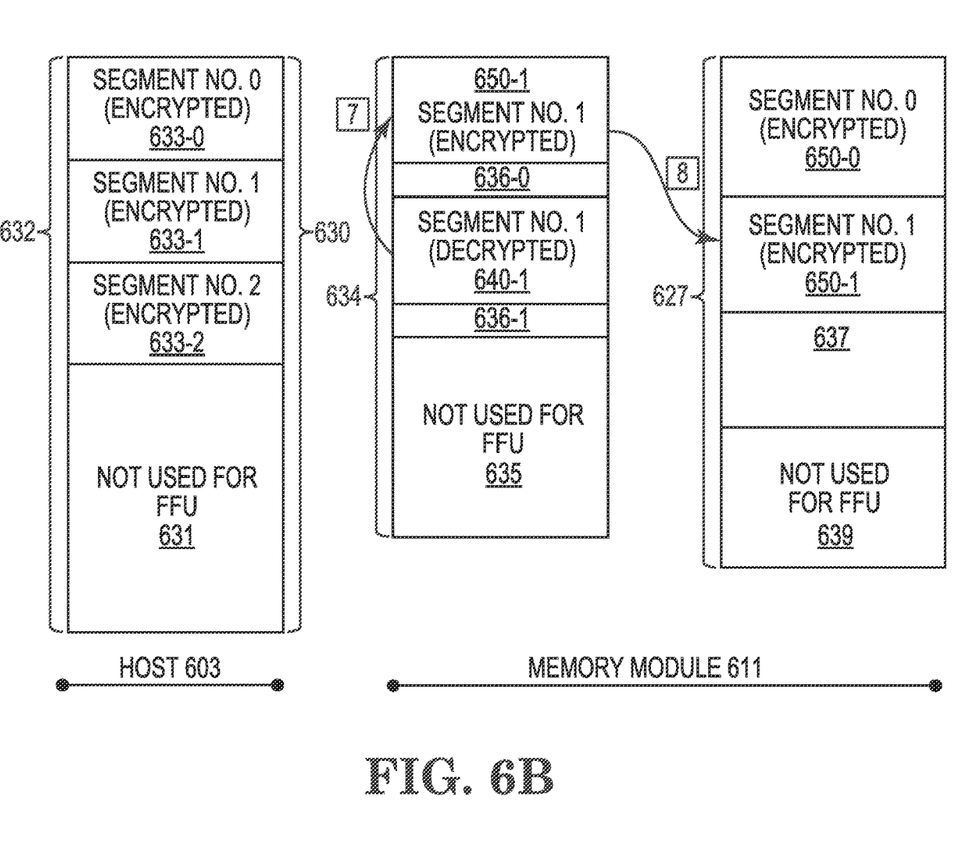

FIGS. 6A-6B illustrate block diagrams representative of FFU in accordance with a number of embodiments of the present disclosure. FIG. 6A illustrates the S-DMA circuitry 642, which can be analogous to the S-DMA circuitry 342 described in association with FIG. 3A. The left side of FIG. 6A represents a state of the S-DMA circuitry 642 at a point in time and the right side of FIG. 6A represents a state of the S-DMA circuitry 642 at a subsequent point in time as illustrated by the arrow pointing to the right representing the flow of time.

The left portion of FIG. 6B represents the memory 632 of the host 603, which can be analogous to the host 103 described in association with FIG. 1. The right portion of FIG. 6B represents the memory module 611, which can be analogous to the memory module 111. The buffer 634 and the memory 627 can be analogous to the buffer 234 and the memory 227, respectively, described in association with FIG. 2.

At 7 of FIGS. 6A-6B, the decrypted segment 640-1 is encrypted (re-encrypted) by the S-DMA circuitry 642 using the second key ($K_B$) 654 and the $context_{B0}$ 658-0. The $context_{B0}$ 658-0 can include the second initial vector ($IV_B$). At the beginning of an encryption and/or decryption process of a data stream B, the IV register can be initialized with a value $IV_B$. The encryption and/or decryption process of the data stream B can be suspended to begin an encryption and/or decryption process of a data stream C. The register then stores a different value than $IV_B$. This value, along with values stored by other registers of the controller 100, is referred to as $context_{B0}$. To resume the encryption and/or decryption process of the data stream B, the IV register can be initialized with a value stored in the $context_{B0}$ and not the initial value $IV_B$.

The S-DMA circuitry 642 can be configured with the $context_{B0}$ 658-0 prior to initiating encryption of the decrypted segment 640-1. The re-encrypted segment 650-1, yielded by encryption of the decrypted segment 640-1, is written to the first portion 636-0 of the buffer 634 by the S-DMA circuitry 642. The encryption of the decrypted segment 640-1 occurs at least partially concurrently with writing of the re-encrypted segment 650-1. After the encryption of the decrypted segment 640-1, the $context_{B0}$ 658-0 is updated with the final value of the second initial vector ($IV_B$) to yield $context_{B1}$ 658-1.

At 8 of FIG. 6B, the re-encrypted segment 650-1 is written to the memory 627. The re-encrypted segment 650-1 can be written to an address of the portion 637 such that the re-encrypted segments 658-0 and 658-1 are stored contiguously (logically and/or physically).

Figure 7A:
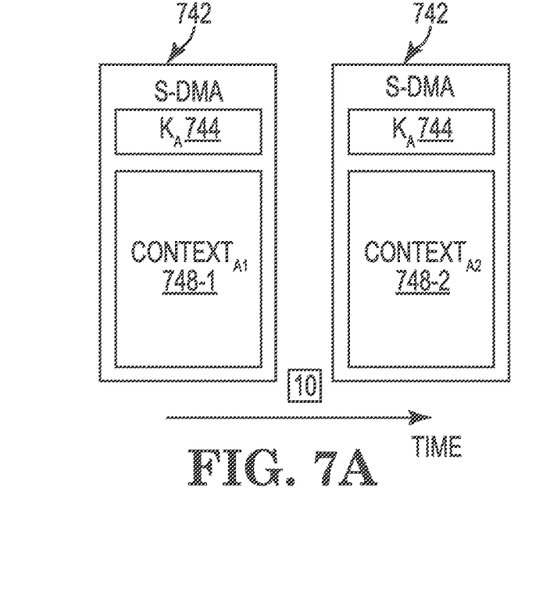
Figure 7B:
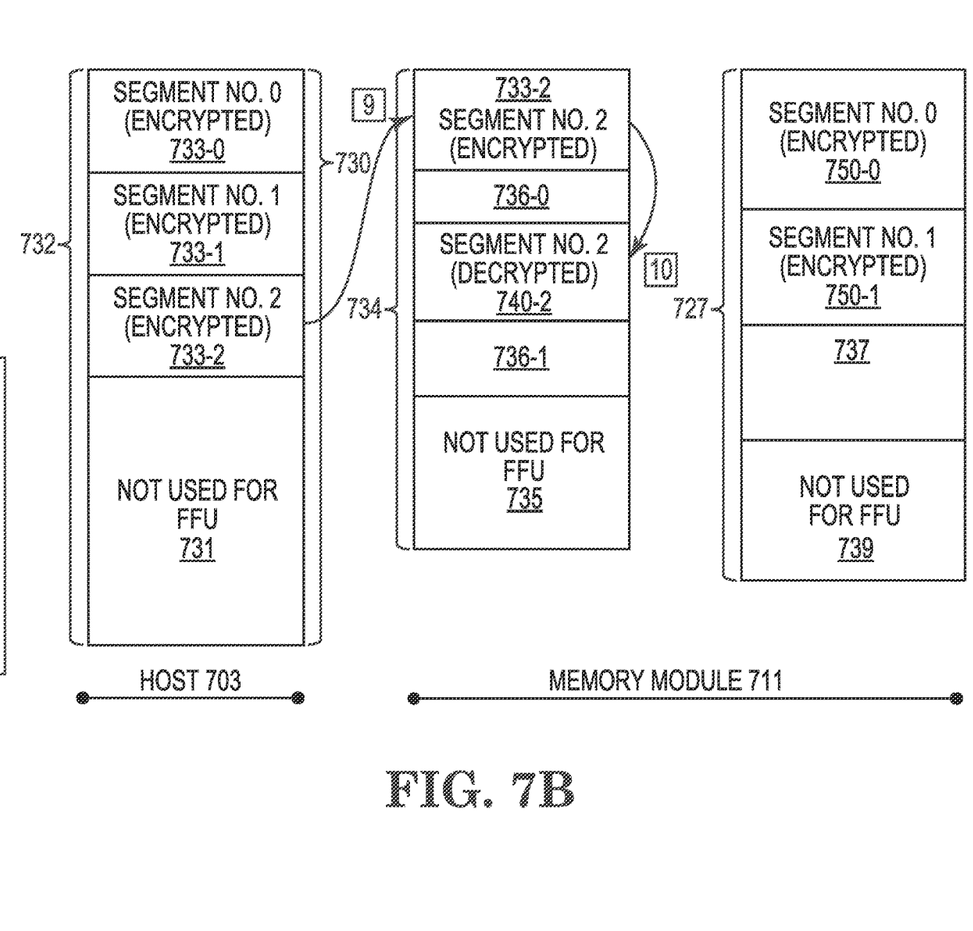

FIGS. 7A-7B illustrate block diagrams representative of FFU in accordance with a number of embodiments of the present disclosure. FIG. 7A illustrates the S-DMA circuitry 742, which can be analogous to the S-DMA circuitry 342 described in association with FIG. 3A. The left side of FIG. 7A represents a state of the S-DMA circuitry 742 at a point in time and the right side of FIG. 7A represents a state of the S-DMA circuitry 742 at a subsequent point in time as illustrated by the arrow pointing to the right representing the flow of time.

The left portion of FIG. 7B represents the memory 732 of the host 703, which can be analogous to the host 103 described in association with FIG. 1. The right portion of FIG. 7B represents the memory module 711, which can be analogous to the memory module 111. The buffer 734 and the memory 727 can be analogous to the buffer 234 and the memory 227, respectively, described in association with FIG. 2.

At 9 of FIG. 7B, the last segment of the FW package 730, the encrypted segment 733-2 is written to the first portion 736-0 of the buffer 734. The writing of the encrypted segment 733-2 can include execution of a CXL command.

At 10 of FIGS. 7A-7B, the encrypted segment 733-2 is decrypted by the S-DMA circuitry 742 using the first key ($K_A$) 744 and the $context_{A1}$ 748-1. The $context_{A1}$ 748-1 can include the first initial vector ($IV_A$). The S-DMA circuitry 742 can be configured with the $context_{A1}$ 748-1 prior to initiating decryption of the encrypted segment 733-2. The decrypted segment 740-2, yielded by decryption of the encrypted segment 733-2, is written to the second portion 736-1 of the buffer 734 by the S-DMA circuitry 742. The decryption of the encrypted segment 733-2 occurs at least partially concurrently with writing of the decrypted segment 740-2. After the decryption of the encrypted segment 733-2, the $context_{A1}$ 748-1 is updated with the final value of the first initial vector ($IV_A$) to yield $context_{A2}$ 748-2.

Figure 8A:
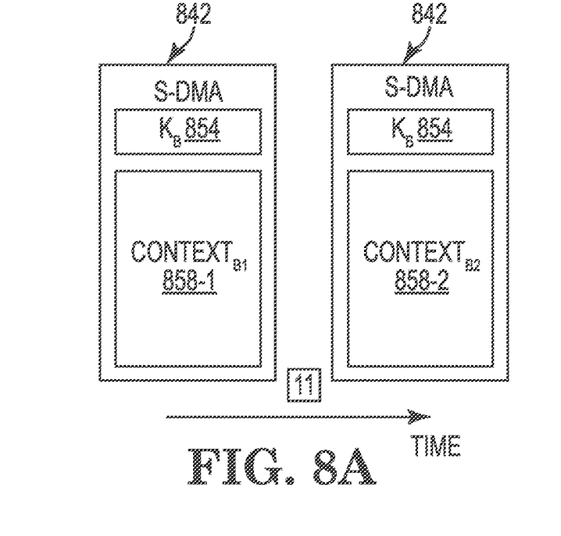
Figure 8B:
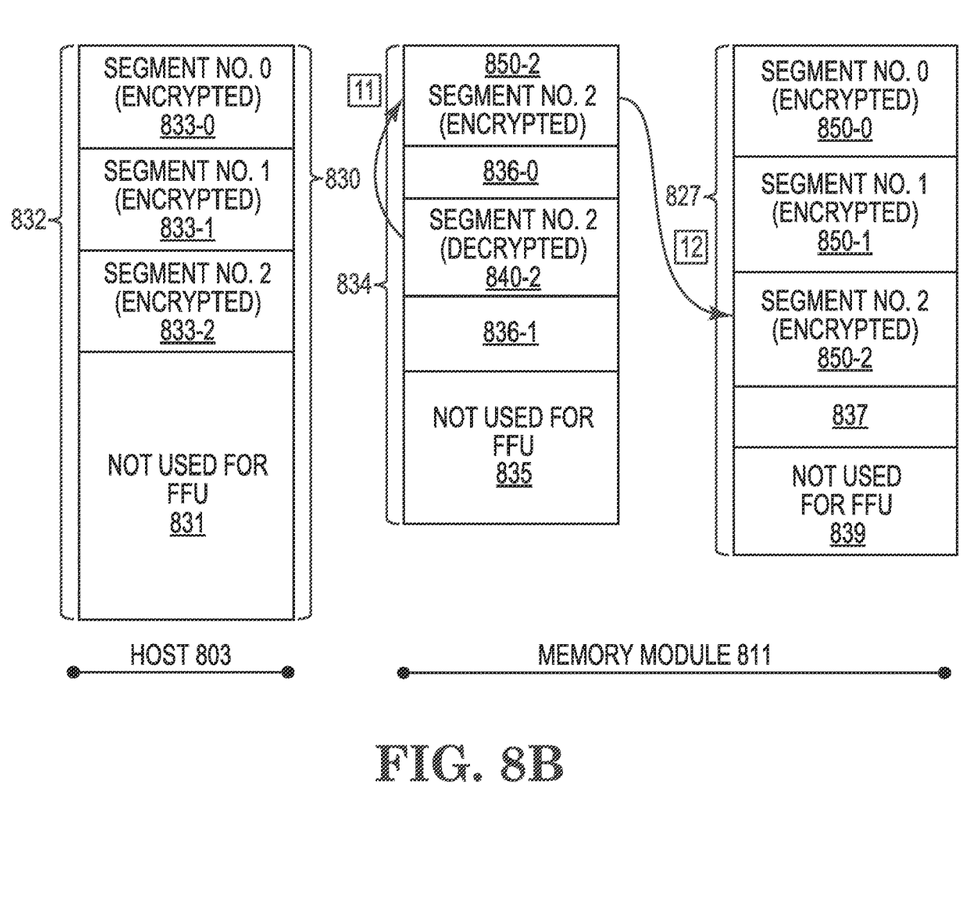

FIGS. 8A-8B illustrate block diagrams representative of FFU in accordance with a number of embodiments of the present disclosure. FIG. 8A illustrates the S-DMA circuitry 842, which can be analogous to the S-DMA circuitry 342 described in association with FIG. 3A. The left side of FIG. 8A represents a state of the S-DMA circuitry 842 at a point in time and the right side of FIG. 8A represents a state of the S-DMA circuitry 842 at a subsequent point in time as illustrated by the arrow pointing to the right representing the flow of time.

The left portion of FIG. 8B represents the memory 832 of the host 803, which can be analogous to the host 103 described in association with FIG. 1. The right portion of FIG. 8B represents the memory module 811, which can be analogous to the memory module 111. The buffer 834 and the memory 827 can be analogous to the buffer 234 and the memory 227, respectively, described in association with FIG. 2.

At 11 of FIGS. 8A-8B, the decrypted segment 840-2 is encrypted (re-encrypted) by the S-DMA circuitry 842 using the second key ($K_B$) 854 and the $context_{B1}$ 858-1. The $context_{B1}$ 858-1 can include the second initial vector ($IV_B$). The S-DMA circuitry 842 can be configured with the $context_{B1}$ 858-1 prior to initiating encryption of the decrypted segment 840-2. The re-encrypted segment 850-2, yielded by encryption of the decrypted segment 840-2, is written to the first portion 836-0 of the buffer 834 by the S-DMA circuitry 842. The encryption of the decrypted segment 840-2 occurs at least partially concurrently with writing of the re-encrypted segment 850-2. After the encryption of the decrypted segment 840-2, the $context_{B1}$ 858-1 is updated with the final value of the second initial vector ($IV_B$) to yield $context_{B2}$ 858-2.

At 12 of FIG. 8B, the re-encrypted segment 850-2 is written to the memory device 822. The re-encrypted segment 850-2 can be written to an address of the portion 837 such that the re-encrypted segments 858-1 and 858-2 are stored contiguously (logically and/or physically).

Figure 9:
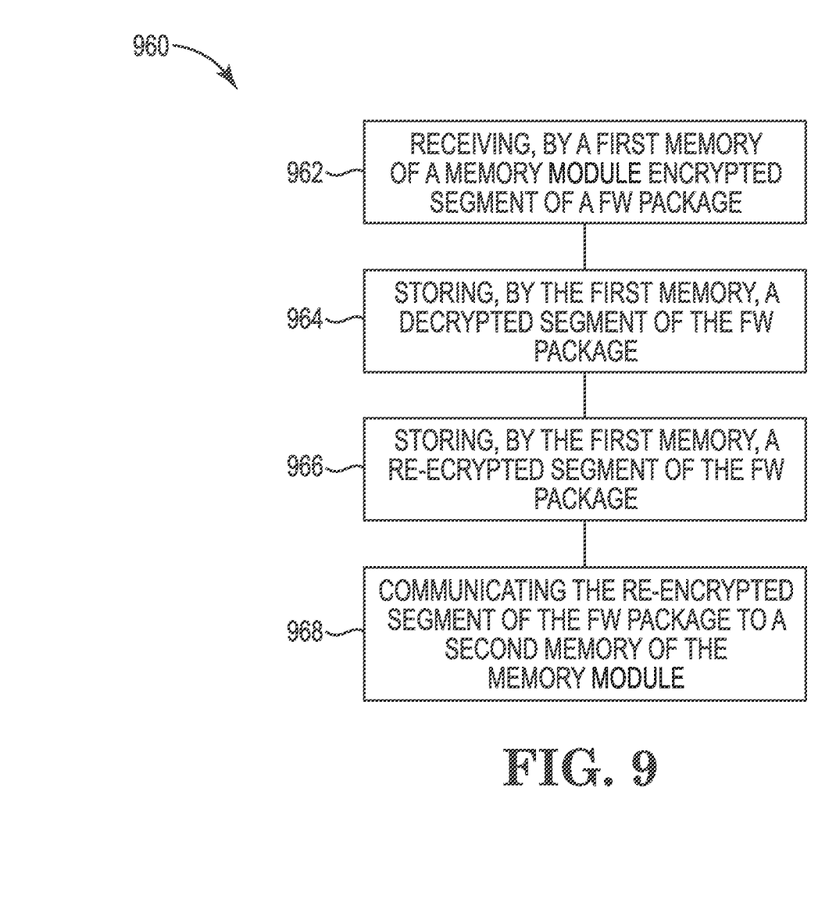
FIG. 9 illustrates a flow diagram of a method for FFU in accordance with a number of embodiments of the present disclosure.

FIG. 9 is a flow diagram of a method 960 for FFU in accordance with a number of embodiments of the present disclosure. Any of the steps and operations of the flow diagram 960 can be performed by the memory controller 100 described in association with FIG. 1.

At 962, the method 960 can include receiving, by a first memory of a memory module, an encrypted segment of a FW package. The encrypted segment of the FW package can be communicated from a host coupled to the memory module to the first memory. The encrypted segment of the FW package can be stored in a first portion of the first memory.

At 964, the method 960 can storing, by the first memory, a decrypted segment of the FW package. The decrypted segment of the FW package can be based on the encrypted segment of the FW package. The decrypted segment of the FW package can be written to a second portion of the first memory.

At 966, the method 960 can storing, by the first memory, a re-encrypted segment of the FW package. The re-encrypted segment of the FW package can be based on the decrypted segment of the FW package. At 968, the method 960 can communicating the re-encrypted segment of the FW package to a second memory of the memory module.

Although not specifically illustrated by FIG. 9, the method 960 can include decrypting, by DMA circuitry of the memory module, the encrypted segment of the FW package using a first key to yield the decrypted segment of the FW package. Writing the decrypted segment of the FW package to the first memory can be performed concurrently with decryption of the encrypted segment of the FW package. A context yielded from decrypting the encrypted segment of the FW package can be stored by the DMA circuitry.

Although not specifically illustrated by FIG. 9, the method 960 can include encrypting, by DMA circuitry, the decrypted segment of the FW package using a second key to yield the re-encrypted segment of the FW package. The re-encrypted segment of the FW package can be written to the first portion of the first memory (the same portion to which the encrypted segment of the FW package is written). Writing the re-encrypted segment of the FW package to the first memory can be performed concurrently with encryption of the decrypted segment of the FW package. A context yielded from encrypting the decrypted segment of the FW package can be stored by the DMA circuitry.

Although not specifically illustrated by FIG. 9, the method 960 can include, subsequent to communicating the re-encrypted segment of the FW package to the second memory, writing a different encrypted segment of the FW package to the first portion of the first memory. The different encrypted segment of the FW package can be decrypted, by the DMA circuitry, using the first key to yield the decrypted segment of the FW package. Writing the different decrypted segment of the FW package to the first memory can be performed concurrently with decryption of the different encrypted segment of the FW package. A context yielded from decrypting the encrypted segment of the FW package can be stored by the DMA circuitry. The different decrypted segment of the FW package can be encrypted, by the DMA circuitry, using the second key to yield a different re-encrypted segment of the FW package. The different re-encrypted segment of the FW package can be written to the first portion of the first memory. Writing the different re-encrypted segment of the FW package to the first memory can be performed concurrently with encryption of the different decrypted segment of the FW package. The different re-encrypted segment of the FW package can be communicated from the first portion of the first memory to the second memory.

Figure 10:
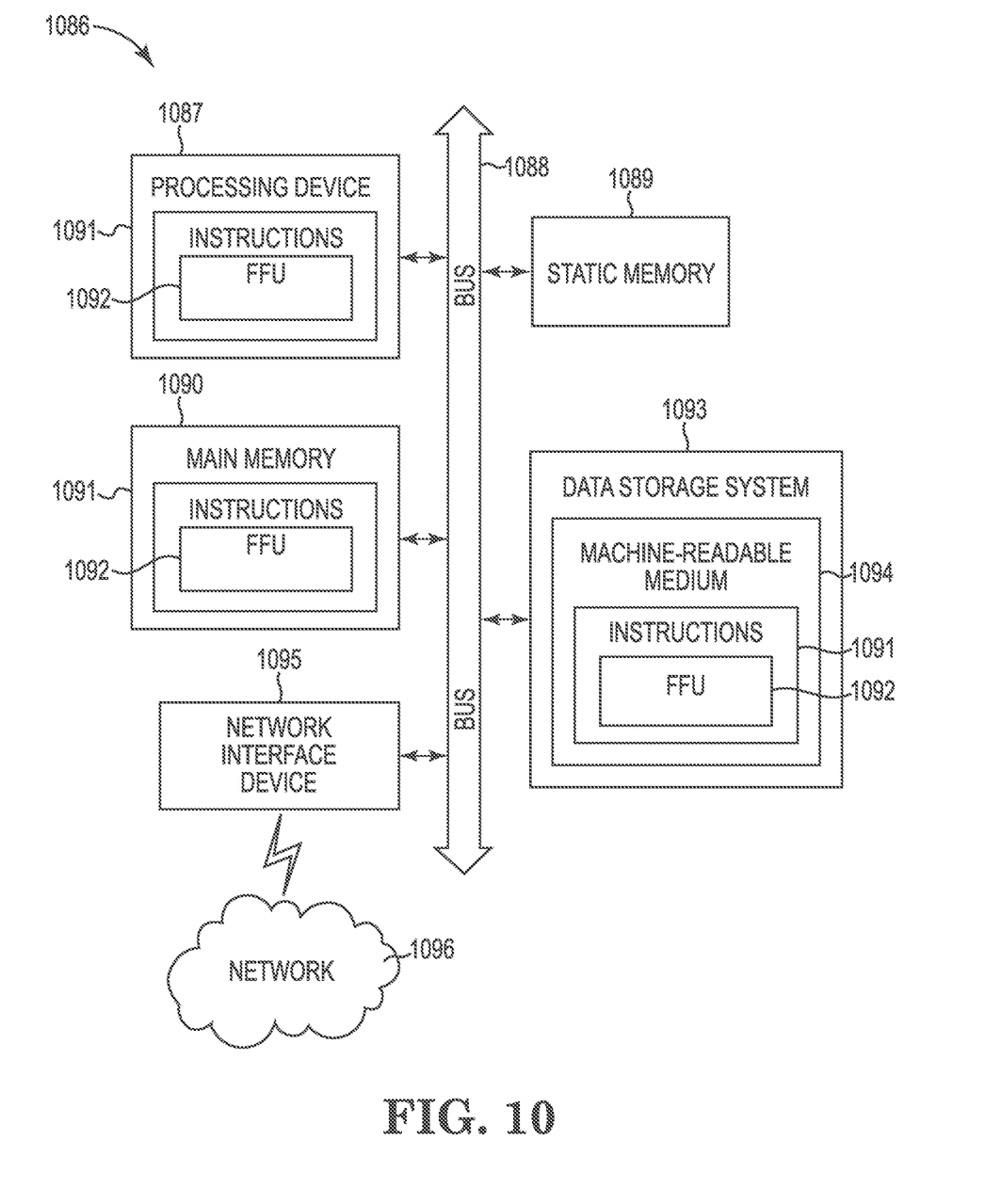
FIG. 10 illustrates a block diagram of a computer system for FFU in accordance with a number of embodiments of the present disclosure.

FIG. 10 is a block diagram of a computer system 1086 for FFU in accordance with a number of embodiments of the present disclosure. The computer system 1086 can be a machine within which a set of instructions, for causing the machine to perform any one or more of the methodologies discussed herein, can be executed. In some embodiments, the computer system 1086 can correspond to a host (e.g., the host 103 described in association with FIG. 1) that includes, is coupled to, or utilizes one or more memory devices (e.g., the memory devices 122) or can be used to perform the operations of a controller (e.g., the memory controller 100) to execute an operating system to perform operations associated with FFU. In alternative embodiments, the machine can be connected (e.g., networked) to other machines in a local access network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1086 includes a processing device 1087, a main memory 1090 (e.g., ROM, flash memory, DRAM such as synchronous DRAM (SDRAM) or Rambus DRAM (RDRAM), etc.), a static memory 1089 (e.g., flash memory, SRAM, etc.), and a data storage system 1093, which communicate with each other via a bus 1088.

The processing device 1087 represents one or more general-purpose processing devices such as a microprocessor, a central processing unit, or the like. More particularly, the processing device 1087 can be a Complex Instruction Set Computing (CISC) microprocessor, Reduced Instruction Set Computing (RISC) microprocessor, Very Long Instruction Word (VLIW) microprocessor, or a processor implementing other instruction sets, or processors implementing a combination of instruction sets. The processing device 1087 can also be one or more special-purpose processing devices such as an Application Specific Integrated Circuit (ASIC), a Field Programmable Gate Array (FPGA), a Digital Signal Processor (DSP), network processor, or the like. The processing device 1087 is configured to execute instructions 1091 for performing the operations and steps discussed herein. The computer system 1086 can further include a network interface device 1095 to communicate over the network 1096.

The data storage system 1093 can include a machine-readable storage medium 1094 (also referred to as a computer-readable medium) on which one or more sets of instructions 1091 or software embodying any one or more of the methodologies or functions described herein is stored. The instructions 1091 can also reside, completely or at least partially, within the main memory 1090 and/or within the processing device 1087 during execution thereof by the computer system 1086, the main memory 1090, and the processing device 1087 also constituting machine-readable storage media. In some embodiments, the machine-readable storage medium 1094, data storage system 1093, and/or main memory 1090 can correspond to the memory devices 122.

In some embodiments, the instructions 1091 can include instructions to implement functionality for FFU (represented in FIG. 10 at 1092). For instance, the instructions 1091 can include instructions to write a first encrypted segment of a FW package to a first portion of a first memory of a memory module. The instructions 1091 can include instructions to cause DMA circuitry of the memory module to decrypt the first encrypted segment of the FW package to yield a first decrypted segment of the FW package written to a second portion of the first memory and encrypt the first decrypted segment of the FW package to yield a first re-encrypted segment of the FW package written to the first portion of the first memory. The instructions 1091 can include instructions to write the first re-encrypted segment of the FW package from the first portion of the first memory to a second memory of the memory module. The instructions 1091 can include instructions to, subsequent to transfer of the first re-encrypted segment of the FW package, write a second encrypted segment of the FW package to the first portion of the first memory; cause the DMA circuitry to decrypt the second encrypted segment of the FW package to yield a second decrypted segment of the FW package written to the second portion of the first memory and encrypt the second decrypted segment of the FW package to yield a second re-encrypted segment of the FW package written to the first portion of the first memory; and write the second re-encrypted segment of the FW package from the first portion of the first memory to the second memory.

The instructions 1091 can include instructions to decrypt the first and second encrypted segments of the FW package using a first key and encrypt the first and second decrypted segments of the FW package using a second key. The instructions 1091 can include instructions to write the first decrypted segment to the second portion of the first memory concurrently with decryption of the first encrypted segment of the FW package. The instructions 1091 can include instructions to write the second decrypted segment to the second portion of the first memory concurrently with decryption of the second encrypted segment of the FW package. The instructions 1091 can include instructions to write the first re-encrypted segment to the first portion of the first memory concurrently with encryption of the first decrypted segment of the FW package The instructions 1091 can include instructions to write the second re-encrypted segment to the first portion of the first memory concurrently with encryption of the second decrypted segment of the FW package.

Although the machine-readable storage medium 1094 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, by a first memory of a memory module, an encrypted segment of a firmware (FW) package associated with a field firmware update (FFU);
storing, by the first memory, a decrypted segment of the FW package;
storing, by the first memory, a re-encrypted segment of the FW package;
communicating the re-encrypted segment of the FW package to a second memory of the memory module; and
subsequent to communicating the re-encrypted segment of the FW package to the second memory:
writing a different encrypted segment of the FW package to the first portion of the first memory; and
concurrently:
decrypting, by the DMA circuitry, the different encrypted segment of the FW package using the first key to yield a different decrypted segment of the FW package; and
writing the different decrypted segment of the FW package to the second portion of the first memory.

2. The method of claim 1, wherein:
the decrypted segment of the FW package is based at least in part on the encrypted segment of the FW package, and
the re-encrypted segment of the FW package is based at least in part on the decrypted segment of the FW package.

3. The method of claim 1, further comprising communicating the encrypted segment of the FW package from a host coupled to the memory module to the first memory.

4. The method of claim 1, further comprising concurrently:
decrypting, by direct memory access (DMA) circuitry of the memory module, the encrypted segment of the FW package using a first key to yield the decrypted segment of the FW package; and
writing the decrypted segment of the FW package to the first memory.

5. The method of claim 4, further comprising storing, by the DMA circuitry, a context yielded from decrypting the encrypted segment of the FW package.

6. The method of claim 4, wherein:
the encrypted segment of the FW package is stored in a first portion of the first memory, and
the method further comprises writing the decrypted segment of the FW package to a second portion of the first memory.

7. The method of claim 6, further comprising concurrently:
encrypting, by the DMA circuitry, the decrypted segment of the FW package using a second key to yield the re-encrypted segment of the FW package; and
writing the re-encrypted segment of the FW package to the first portion of the first memory.

8. The method of claim 7, further comprising storing a context yielded from encrypting the decrypted segment of the FW package by the DMA circuitry.

9. The method of claim 1, further comprising:
concurrently:
encrypting, by the DMA circuitry, the different decrypted segment of the FW package using the second key to yield a different re-encrypted segment of the FW package; and
writing the different re-encrypted segment of the FW package to the first portion of the first memory; and communicating the different re-encrypted segment of the FW package from the first portion of the first memory to the second memory.

10. An apparatus comprising:
a buffer;
a memory coupled to the buffer; and
a controller coupled to the buffer and the memory, wherein the controller includes a management unit having direct memory access (DMA) circuitry configured to:
direct writing of respective encrypted segments of a firmware (FW) package to a first address space of the buffer and,
direct writing of respective encrypted segments of a firmware (FW) package to a second address space of the buffer,
wherein the FW package is associated with a field firmware update (FFU);
decrypt the respective encrypted segments of the FW package stored in the buffer using a first key to yield respective decrypted segments of the FW package;
direct writing of the respective decrypted segments of the FW package to the buffer;
encrypt the respective decrypted segments of the FW package stored in the buffer using a second key to yield respective re-encrypted segments of the FW package;
direct writing of the respective re-encrypted segments of the FW package to the first address space of the buffer; and
direct writing of the respective re-encrypted segments of the FW package from the buffer to the memory.

11. The apparatus of claim 10, wherein the control circuitry is further configured to direct writing of the respective decrypted segments of the FW package to the buffer concurrently with decryption of the respective encrypted segments of the FW package.

12. The apparatus of claim 10, wherein the control circuitry is further configured to direct writing of the respective re-encrypted segments of the FW package to the buffer concurrently with encryption of the respective decrypted segments of the FW package.

13. The apparatus of claim 10, wherein the control circuitry is further configured to:
decrypt the respective encrypted segments of the FW package stored in the buffer using the first key and a first initial vector (IV) to yield the respective decrypted segments of the FW package; and
encrypt the respective decrypted segments of the FW package stored in the buffer using the second key and a second IV to yield the respective re-encrypted segments of the FW package.

14. The apparatus of claim 10, wherein:
the control circuitry comprises direct memory access (DMA) circuitry, and
the DMA circuitry is configured to:
decrypt the respective encrypted segments of the FW package stored in the buffer; and
encrypt the respective decrypted segments of the FW package stored in the buffer.

15. The apparatus of claim 14, wherein the DMA circuitry is configured with respective context from a preceding encryption of one of the decrypted segments of the FW package prior to decryption of one of the encrypted segments of the FW package.

16. The apparatus of claim 10, wherein the FW package is encrypted according to an advanced encryption standard (AES).

17. The apparatus of claim 10, wherein a first one of the encrypted segments of the FW package is of a different size than a second one of the encrypted segments of the FW package.

18. The apparatus of claim 10, wherein the apparatus is a Compute Express Link (CXL) memory.

19. A non-transitory medium storing instructions executable by a processing device to:
write a first encrypted segment of a firmware (FW) package to a first portion of a first memory of a memory module, wherein the FW package is associated with a field firmware update (FFU);
cause direct memory access (DMA) circuitry of the memory module to:
decrypt the first encrypted segment of the FW package to yield a first decrypted segment of the FW package written to a second portion of the first memory; and
encrypt the first decrypted segment of the FW package to yield a first re-encrypted segment of the FW package written to the first portion of the first memory;
write the first re-encrypted segment of the FW package from the first portion of the first memory to a second memory of the memory module; and
subsequent to transfer of the first re-encrypted segment of the FW package:
write a second encrypted segment of the FW package to the first portion of the first memory;
cause the DMA circuitry to:
decrypt the second encrypted segment of the FW package to yield a second decrypted segment of the FW package written to the second portion of the first memory; and
encrypt the second decrypted segment of the FW package to yield a second re-encrypted segment of the FW package written to the first portion of the first memory; and
write the second re-encrypted segment of the FW package from the first portion of the first memory to the second memory.

20. The medium of claim 19, further storing instructions executable to:
decrypt the first and second encrypted segments of the FW package using a first key; and
encrypt the first and second decrypted segments of the FW package using a second key.

21. The medium of claim 19, further storing instructions executable to:
write the first decrypted segment to the second portion of the first memory concurrently with decryption of the first encrypted segment of the FW package; and
write the second decrypted segment to the second portion of the first memory concurrently with decryption of the second encrypted segment of the FW package.

22. The medium of claim 19, further storing instructions executable to:
write the first re-encrypted segment to the first portion of the first memory concurrently with encryption of the first decrypted segment of the FW package; and
write the second re-encrypted segment to the first portion of the volatile memory concurrently with encryption of the second decrypted segment of the FW package.

23. A system, comprising:
a host; and
a memory module coupled to the host, wherein the memory module comprises:
- a buffer;
- a Compute Express Link (CXL) memory coupled to the buffer; and
- circuitry a controller coupled to the buffer and the CXL memory, wherein the controller includes a management unit configured to:
  - direct transfer of segments of a firmware (FW) package from the host to the buffer, wherein the FW package is associated with a field firmware update (FFU);
  - direct writing of respective encrypted segments of a firmware (FW package from the host to a first address space of the buffer and,
  - direct writing of respective encrypted segments of a firmware (FW) package to a second address space of the buffer,
  - decrypt the segments of the FW package using a first key associated with the host to yield decrypted segments of the FW package;
  - encrypt the decrypted segments of the FW package using a second key associated with the CXL memory to yield re-encrypted segments of the FW package;
  - direct writing of the re-encrypted segments of the FW package to the first buffer; and
  - direct writing of the re-encrypted segments of the FW package from the buffer to the CXL memory.

* * * * *